United States Patent
Nakano et al.

(10) Patent No.: US 11,852,192 B2
(45) Date of Patent: Dec. 26, 2023

(54) MOTION GUIDE APPARATUS

(71) Applicant: THK CO., LTD., Tokyo (JP)

(72) Inventors: Tadashi Nakano, Tokyo (JP); Takama Igarashi, Tokyo (JP); Hajime Fukushima, Tokyo (JP); Go Tamura, Tokyo (JP)

(73) Assignee: THK CO., LTD., Tokyo (JP)

( * ) Notice: Subject to any disclaimer, the term of this patent is extended or adjusted under 35 U.S.C. 154(b) by 175 days.

(21) Appl. No.: 17/297,161

(22) PCT Filed: Nov. 14, 2019

(86) PCT No.: PCT/JP2019/044721
§ 371 (c)(1),
(2) Date: May 26, 2021

(87) PCT Pub. No.: WO2020/110754
PCT Pub. Date: Jun. 4, 2020

(65) Prior Publication Data
US 2022/0025927 A1   Jan. 27, 2022

(30) Foreign Application Priority Data

Nov. 27, 2018  (JP) .................................. 2018-220828
Nov. 27, 2018  (JP) .................................. 2018-220829

(51) Int. Cl.
*F16C 29/06*   (2006.01)

(52) U.S. Cl.
CPC ...... *F16C 29/0604* (2013.01); *F16C 29/0609* (2013.01); *F16C 2240/50* (2013.01)

(58) Field of Classification Search
CPC .............. F16C 29/0604; F16C 29/0609; F16C 29/0642; F16C 29/0644; F16C 29/0652–0666; F16C 2240/50
See application file for complete search history.

(56) References Cited

U.S. PATENT DOCUMENTS

| | | |
|---|---|---|
| 5,363,741 A | 11/1994 | Takada et al. |
| 2004/0020067 A1 | 2/2004 | Matsumoto |

(Continued)

FOREIGN PATENT DOCUMENTS

| | | |
|---|---|---|
| CN | 101027499 A | 8/2007 |
| CN | 104806632 A | 7/2015 |

(Continued)

OTHER PUBLICATIONS

International Search Report dated Dec. 24, 2019, issued in counterpart application No. PCT/JP2019/044721 (1 page).

(Continued)

*Primary Examiner* — Alan B Waits
(74) *Attorney, Agent, or Firm* — WHDA, LLP

(57) ABSTRACT

A motion guide apparatus which can prevent the motion guide apparatus from rattling when being used in an environment where an excessive moment works thereon. A crowning is formed at an end of a loaded rolling element rolling surface of a movable member, and a chamfer is formed at an end of the crowning. Let a total length of the crowning and the chamfer in a length direction of the loaded rolling element rolling surface be L. Let the diameter of a ball be Da. L/Da>4 is set. A maximum depth D of the chamfer is set to equal to or greater than the elastic deformation amount of a rolling element rolling surface of a track member, the loaded rolling element rolling surface of the movable member, and the rolling element under a radial load equal to or greater than 60% of the basic dynamic load rating.

9 Claims, 18 Drawing Sheets

(56) References Cited

U.S. PATENT DOCUMENTS

| | | | |
|---|---|---|---|
| 2004/0240757 A1 | 12/2004 | Matsumoto | |
| 2007/0211969 A1* | 9/2007 | Shimizu | F16C 29/06 384/45 |
| 2008/0124011 A1* | 5/2008 | Mizumura | F16C 29/0604 384/45 |
| 2008/0298729 A1* | 12/2008 | Kakei | F16C 29/005 384/44 |
| 2019/0107149 A1 | 4/2019 | Aoki et al. | |

FOREIGN PATENT DOCUMENTS

| | | |
|---|---|---|
| CN | 204572781 U | 8/2015 |
| CN | 105570295 A | 5/2016 |
| CN | 205937472 U | 2/2017 |
| CN | 206694405 U | 12/2017 |
| CN | 108779797 A | 11/2018 |
| JP | 2003-322150 A | 11/2003 |
| JP | 2004-36838 A | 2/2004 |
| JP | 2004-138193 A | 5/2004 |
| JP | 2004-169830 A | 6/2004 |
| JP | 2004-324737 A | 11/2004 |
| JP | 2006-316886 A | 11/2006 |
| JP | 2008-133837 A | 6/2008 |
| JP | 2008-291932 A | 12/2008 |
| TW | 201706518 A | 2/2017 |

OTHER PUBLICATIONS

Office Action dated Jun. 22, 2022, issued in counterpart CN application No. 201980078141.6, with English translation. (12 pages).
1 Office Action dated Oct. 8, 2022, issued in counterpart TW Application No. 108142173.

* cited by examiner

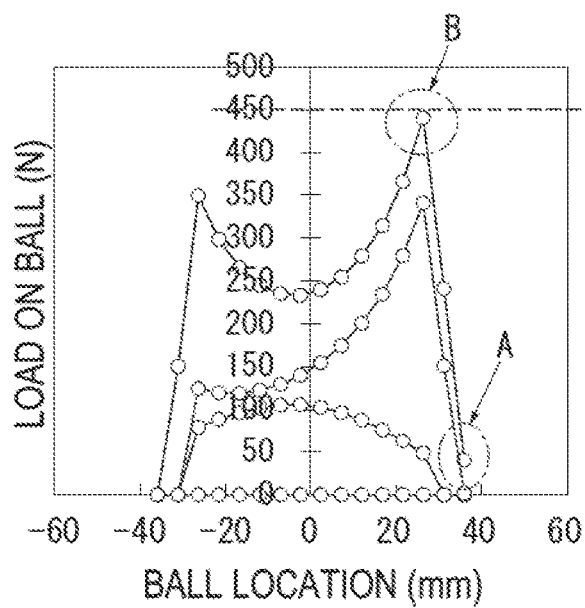 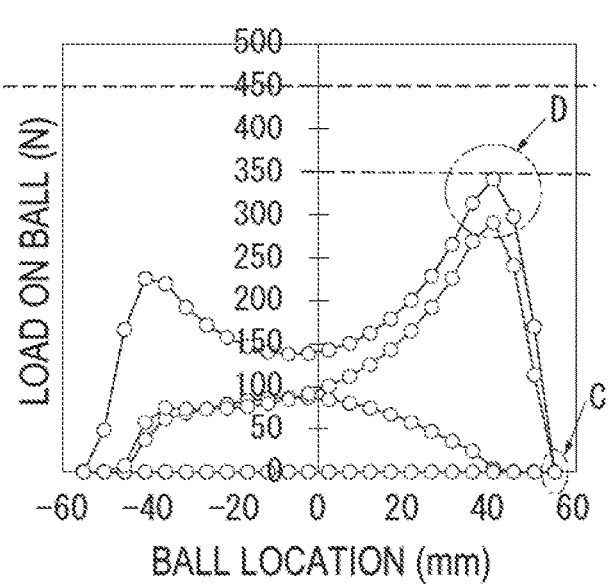
*FIG. 18A*  *FIG. 18B*

MOTION GUIDE APPARATUS

TECHNICAL FIELD

The present invention relates to a motion guide apparatus where a movable member is assembled to a track member via a plurality of rolling elements in such a manner as to be movable relative to the track member.

BACKGROUND ART

A motion guide apparatus includes a track member having a rolling element rolling surface, and a movable member having a loaded rolling element rolling surface facing the rolling element rolling surface of the track member. The rolling element rolling surface of the track member and the loaded rolling element rolling surface of the movable member configure a loaded path. Balls go in and out of the loaded path with the movement of the movable member relative to the track member.

To cause the balls to smoothly go in and out of the loaded path, an end of the loaded rolling element rolling surface of the movable member is crowned (refer to Patent Literature 1).

In the known motion guide apparatus, the depth of the crowning is set to equal to or greater than the approach distance between the movable member and the track member (the distance of approach between the movable member and the track member due to the elastic deformation of a contact portion of the rolling element, and the elastic deformation amount of the rolling element rolling surface of the track member, the loaded rolling element rolling surface of the movable member, and the rolling element). This is for preventing the rolling element that enters the loaded path from colliding with an end of the movable member. The depth of the crowning is the elastic deformation amount under a load equal to or less than 50% of the basic dynamic load rating (C) in accordance with the requirement of ISO as a guideline.

Moreover, in the known motion guide apparatus, the length of the crowning is set to equal to or less than double a diameter Da of the rolling element. This is because it has been considered that, if the length of the crowning is increased, the load capacity (that is, stiffness) of the motion guide apparatus is reduced and the life of the motion guide apparatus is reduced.

CITATION LIST

Patent Literature

Patent Literature 1: JP 2006-316886 A

SUMMARY OF INVENTION

Technical Problem

However, the inventors have found that, if a motion guide apparatus is used in an environment where an excessive moment works thereon, an unprecedented phenomenon, that is, a phenomenon where an end of a loaded rolling element rolling surface of a movable member malfunctions at an early stage and the motion guide apparatus rattles, occurs. This phenomenon results in a gap between the calculated life and the actual life. This phenomenon may also occur when the stiffness of a mounted member where the motion guide apparatus is mounted is insufficient, or when the mounting precision of the motion guide apparatus is insufficient.

The reason why the end of the loaded rolling element rolling surface of the movable member malfunctions is that the movable member inclines relative to a track member about an axis running from left to right, and a gap between the end of the loaded rolling element rolling surface of the movable member and a rolling element rolling surface of the track member is reduced. If the gap is reduced, a ball collides with an end of a crowning to cause a malfunction in the end of the loaded rolling element rolling surface of the movable member at an early stage. Moreover, an increase in load on the ball at a boundary between the loaded rolling element rolling surface and the crowning of the movable member, the boundary having the minimum gap, is also considered to be one of the causes.

The present invention has been made considering the above problem, and an object thereof is to provide a motion guide apparatus that can prevent the motion guide apparatus from rattling at an early stage even when being used in an environment where an excessive moment works thereon.

Solution to Problem

In order to solve the above problem, one aspect of the present invention is a motion guide apparatus including: a track member having a rolling element rolling surface; and a movable member having a loaded rolling element rolling surface facing the rolling element rolling surface of the track member, the movable member being configured to be assembled to the track member via a plurality of rolling elements in such a manner as to be movable relative to the track member, in which a crowning is formed at an end of the loaded rolling element rolling surface of the movable member, and a chamfer is formed at an end of the crowning, and L/Da>4 is set, where L is a total length of the crowning and the chamfer in a length direction of the loaded rolling element rolling surface of the movable member, and Da is the diameter of the rolling element.

In order to solve the above problem, another aspect of the present invention is a motion guide apparatus including: a track member having a rolling element rolling surface; and a movable member configured to be assembled to the track member via a plurality of rolling elements in such a manner as to be movable, the movable member having: a movable member body having a loaded rolling element rolling surface facing the rolling element rolling surface of the track member, and a return path substantially parallel to the loaded rolling element rolling surface; and a lid member provided at an end of the movable member body, the lid member having a turn-around path connected to the loaded rolling element rolling surface and the return path of the movable member body, in which a first inclined surface inclined relative to the loaded rolling element rolling surface is formed at an end of the loaded rolling element rolling surface of the movable member body, a second inclined surface inclined more than the first inclined surface is formed at an end of the first inclined surface, and $L_1 \geq 1$ Da, $L_2 \geq 1$ Da, and $L_1 > L_2$ are set, where $L_1$ is the length of the first inclined surface in a length direction of the loaded rolling element rolling surface of the movable member body, $L_2$ is the length of the second inclined surface in the length direction, and Da is the diameter of the rolling element.

Advantageous Effects of Invention

Contrary to the known general idea that the load capacity become reduced and the life of a motion guide apparatus become reduced if a crowning is increased in length and depth, one aspect of the present invention is that the length of the crowning is increased, and the chamfer for preventing a collision of a ball is formed at the end of the crowning; therefore, the motion guide apparatus is prevented from rattling at an early stage when an excessive moment works thereon.

According to the one aspect of the present invention, the chamfer is formed at the end of the crowning; accordingly, it is possible to prevent the ball that enters a loaded path from colliding with an end of the movable member even when the movable member inclines relative to the track member.

Moreover, the total length L of the crowning and the chamfer is designed to be long; accordingly, it is possible to increase the number of balls that can receive load and prevent the application of excessive load to each ball when the movable member inclines relative to the track member.

According to another aspect of the present invention, $L_1 \geq 1$ Da and $L_2 \geq 1$ Da are set; accordingly, when the movable member inclines relative to the track member, the plurality of rolling elements in the first inclined surface and the second inclined surface of the movable member body can receive load and the application of excessive load to each rolling element can be prevented. Moreover, $L_1 > L_2$ is set; accordingly, it is possible to further increase the load capacity of the motion guide apparatus.

BRIEF DESCRIPTION OF DRAWINGS

FIG. 18A is a graph illustrating load on the ball of the known motion guide apparatus crowned in a standard manner, and FIG. 18B is a graph illustrating load on the ball of the motion guide apparatus according to the embodiment.

DESCRIPTION OF EMBODIMENTS

A motion guide apparatus according to embodiments of the present invention is described hereinafter on the basis of the accompanying drawings. However, the motion guide apparatus of the present invention can be embodied in various modes and is not limited to the embodiments described in the description. The embodiments are provided with the intention of enabling those skilled in the art to fully understand the scope of the invention by fully disclosing the description.

First Embodiment

Figure 1:
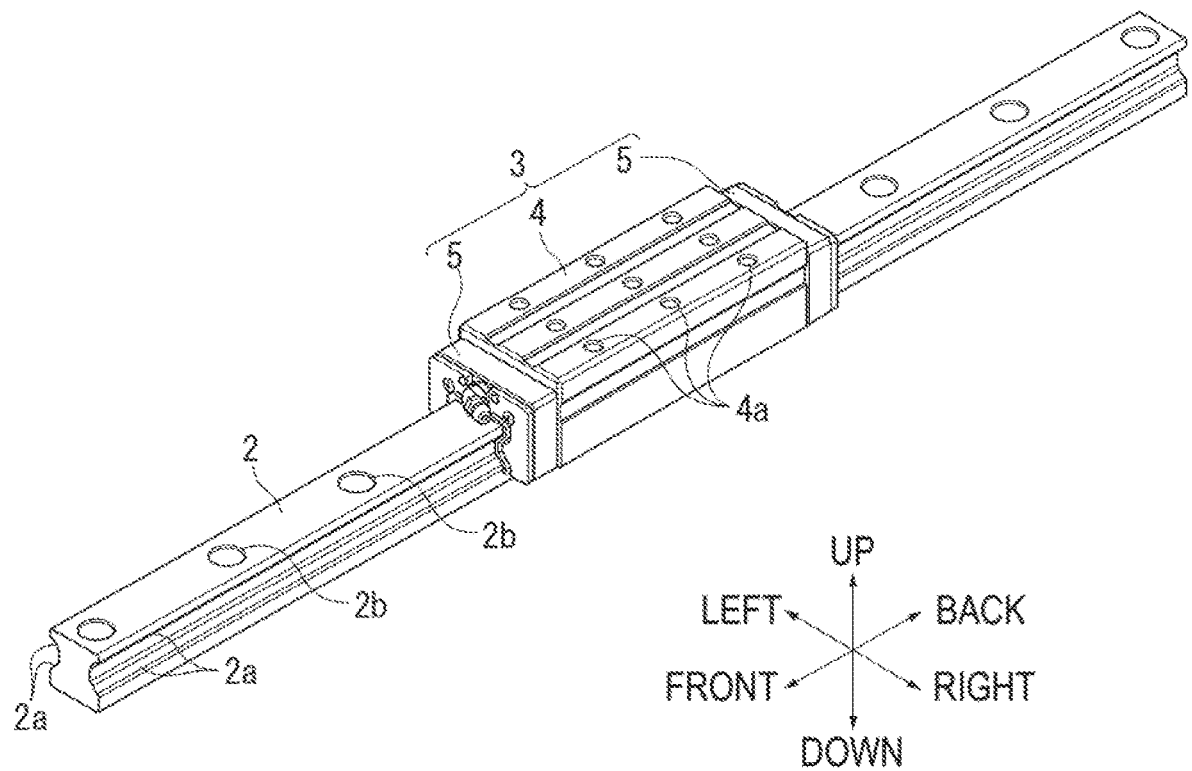
FIG. 1 is a perspective view of a motion guide apparatus according to a first embodiment of the present invention.

FIG. 1 illustrates a perspective view of a motion guide apparatus according to a first embodiment of the present invention. For the sake of explanation, assuming that the motion guide apparatus is placed on a horizontal plane, the configuration of the motion guide apparatus is described below on the basis of directions as viewed in a length direction of a rail as a track member, that is, a front-and-back direction, an up-and-down direction, and a left-and-right direction in FIG. 1. Naturally, the placement of the motion guide apparatus is not limited to the above.

A motion guide apparatus 1 includes a rail 2, and a movable member 3 that is assembled to the rail 2 in such a manner as to be movable relative to the rail 2 in a length direction thereof. A plurality of ball rolling surfaces 2a as rolling element rolling surfaces is formed along a longitudinal direction on side surfaces of the rail 2. The ball rolling surface 2a is shaped into a groove. A plurality of bolt holes 2b for mounting the rail 2 on a mounted member 8 (refer to FIG. 3) is formed with a constant pitch in an upper surface of the rail 2.

The movable member 3 includes a movable member body 4, and a lid member 5 provided at each of both ends of the movable member body 4. Circulation paths 7 (refer to FIG.

2) for balls 6 are formed inside the movable member 3. A plurality of the balls 6 as rolling elements circulates in the circulation path 7 with the relative movement of the movable member 3. A plurality of screw holes 4a for mounting the movable member 3 on a mounted member 9 (refer to FIG. 3) is formed in an upper surface of the movable member body 4.

Figure 2:
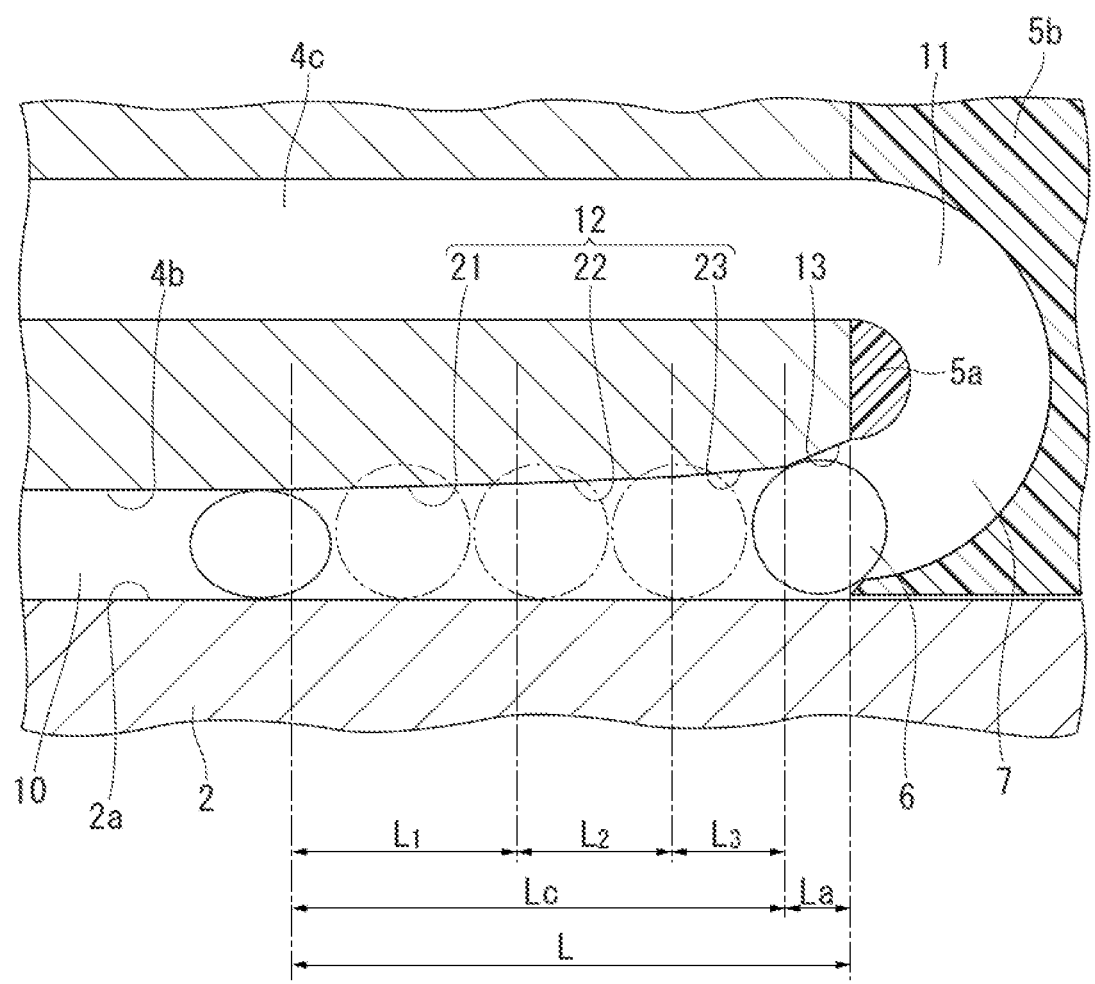
FIG. 2 is a cross-sectional view of a circulation path of the motion guide apparatus according to the embodiment.

FIG. 2 illustrates a cross-sectional view of the circulation path 7 of the motion guide apparatus 1 according to the embodiment. The movable member body 4 includes loaded ball rolling surfaces 4b formed as loaded rolling element rolling surfaces facing the ball rolling surfaces 2a of the rail 2, and also return paths 4c formed substantially parallel to the loaded ball rolling surfaces 4b. The loaded ball rolling surface 4b is shaped into a groove. Turn-around paths 11 each connected to the loaded ball rolling surface 4b and the return path 4c are formed in the lid member 5. The lid member 5 includes inner guides 5a that each form an inner peripheral side of the turn-around path 11, and outer guides 5b that each form an outer peripheral side of the turn-around path 11.

The loaded ball rolling surface 4b of the movable member 3 and the ball rolling surface 2a of the rail 2 configure a loaded path 10. The loaded path 10, the return path 4c, and the turn-around paths 11 configure the circulation path 7 for the balls 6. The ball 6 enters the loaded path 10 from the turn-around path 11, and leaves the loaded path 10 to the turn-around path 11. A spacer may or may not be disposed between the balls 6.

The motion guide apparatus 1 according to the embodiment is used in an environment where an excessive moment, particularly a pitching moment, works thereon. In this case, as illustrated in FIG. 1, the movable member 3 inclines relative to the rail 2 about an axis running from left to right.

Figure 3:
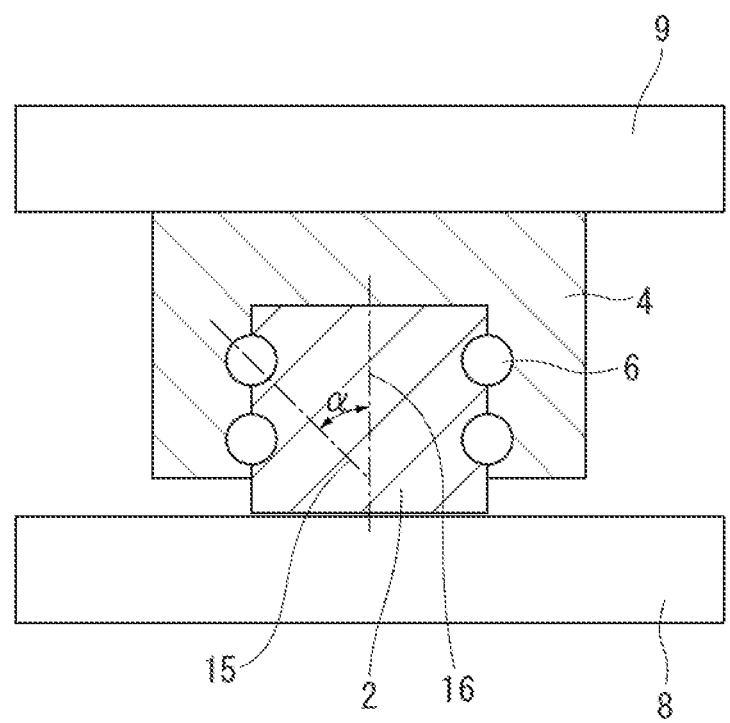
FIG. 3 is a cross-sectional view (a cross-sectional view orthogonal to a moving direction) of the motion guide apparatus according to the embodiment.
Figure 4:
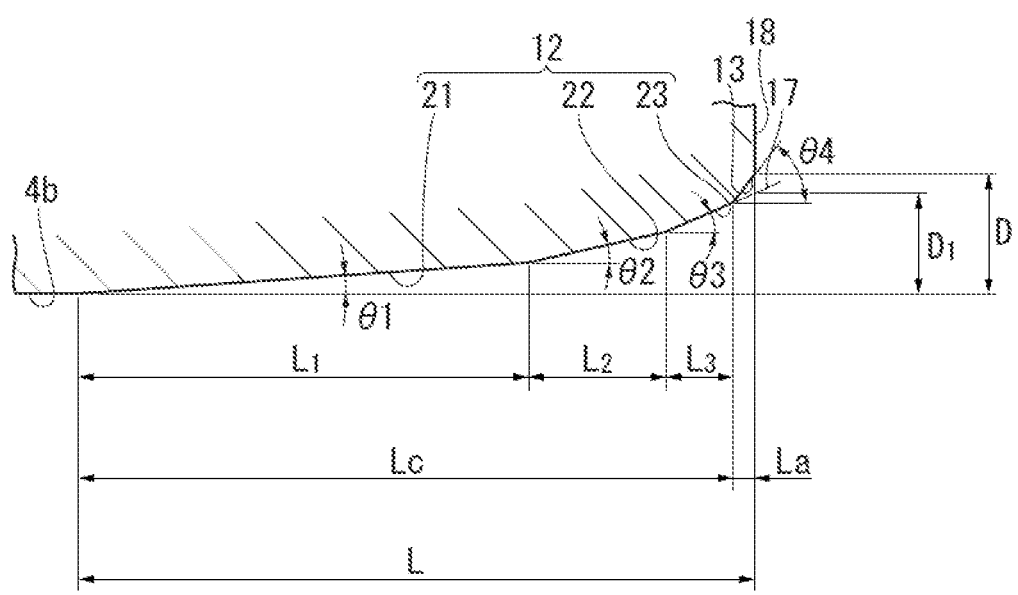
FIG. 4 illustrates a crowning and a chamfer as viewed in cross section in a contact angle direction.

FIG. 3 illustrates a cross-sectional view of the motion guide apparatus 1. The reference sign 2 denotes the rail, the reference sign 4 denotes the movable member body, the reference signs 8 and 9 denote the mounted members, and the reference sign 6 denotes the ball. In FIG. 3, the return paths 4c in the movable member body 4 are omitted. FIG. 4 illustrates a crowning and a chamfer as viewed in cross section in a contact angle direction.

A typical example of the mounted members 8 and 9 is a base of a machine tool, and is a rigid body. However, if the mounted member 8 is, for example, a hollow member with low stiffness, the stiffness of the mounted member 8 is insufficient, the rail 2 deforms, and the rail 2 inclines relative to the movable member 3. The same applies if the mounting precision of the motion guide apparatus 1 is insufficient. In other words, the motion guide apparatus 1 according to the embodiment can be used not only when an excessive pitching moment works thereon but also when the stiffness of the mounted members 8 and 9 is insufficient, or when the mounting precision of the motion guide apparatus 1 is insufficient.

As illustrated in FIG. 2, a crowning 12 is formed at each of both ends of the loaded ball rolling surface 4b of the movable member 3. A chamfer 13 is formed at each of both ends of the crowning 12. FIG. 2 illustrates the crowning 12 and the chamfer 13 at one end of the loaded ball rolling surface 4b. However, the crowning 12 and the chamfer 13 are formed at each of both ends of the loaded ball rolling surface 4b. The crowning 12 is inclined relative to the loaded ball rolling surface 4b. The chamfer 13 is inclined relative to the crowning 12 and more than the crowning 12.

As illustrated in FIG. 4, a total length L of a length Lc of the crowning 12 and a length La of the chamfer 13 in a length direction of the loaded ball rolling surface 4b (that is, L=Lc+La) is set to L/Da>4 where Da is the diameter of the ball 6. In other words, the total length L is set to greater than a length equal to four balls 6, preferably L/Da 5. The combined length of the crownings 12 and the chambers 13 at both ends of the movable member 3 (that is, 2 L) is set to, for example, 10 to 50% of the total length of the movable member body 4 in the relative movement direction.

The crowning 12 includes a first inclined surface 21, a second inclined surface 22, and a third inclined surface 23. The first inclined surface 21 is formed next to the loaded ball rolling surface 4b, and inclined relative to the loaded ball rolling surface 4b. The second inclined surface 22 is formed next to the first inclined surface 21, and inclined more than the first inclined surface 21. The third inclined surface 23 is formed next to the second inclined surface 22, and inclined more than the second inclined surface 22. The chamfer 13 is formed next to the third inclined surface 23, and inclined more than the third inclined surface 23. Let the angle formed between the loaded ball rolling surface 4b and the first inclined surface 21 be θ1, let the angle formed between the loaded ball rolling surface 4b and the second inclined surface 22 be θ2, let the angle formed between the loaded ball rolling surface 4b and the third inclined surface 23 be θ3, and let the angle formed between the loaded ball rolling surface 4b and the chamfer 13 be θ4. θ1<θ2<θ3<θ4 is set.

FIG. 4 illustrates the crowning 12 and the chamfer 13 as viewed in cross section in the contact angle direction. As illustrated in FIG. 3, a contact angle α is the angle formed between a line 15 linking a ball contact point on the rail 2 side and a ball contact point on the movable member 3 side and a radial load working direction 16. For example, if the contact angle α is 45°, it indicates that the ball rolling surface 2a and the loaded ball rolling surface 4b, and the ball 6 are in contact with each other with an inclination of 45° relative to the radial load working direction 16.

A maximum depth D of the chamfer 13 illustrated in FIG. 4 (the depth from the loaded ball rolling surface 4b to an end of the chamfer 13) is set to equal to or greater than the elastic deformation amount of the ball rolling surface 2a and the loaded ball rolling surface 4b, and the ball 6 under a radial load equal to or greater than 60% (for example, 60%, 70%, 80%, 90%, or 100%) of the basic dynamic load rating (C). Moreover, a crowning depth $D_1$ from the loaded ball rolling surface 4b to a point of intersection of an extended line 17 of the crowning 12 (the extended line 17 of the third inclined surface 23 in the embodiment) and an end surface 18 of the movable member body 4 is also set to equal to or greater than the elastic deformation amount under a radial load equal to or greater than 60% of the basic dynamic load rating (C). The basis dynamic load rating (C) is determined depending on the structure of the motion guide apparatus 1.

Figure 5:
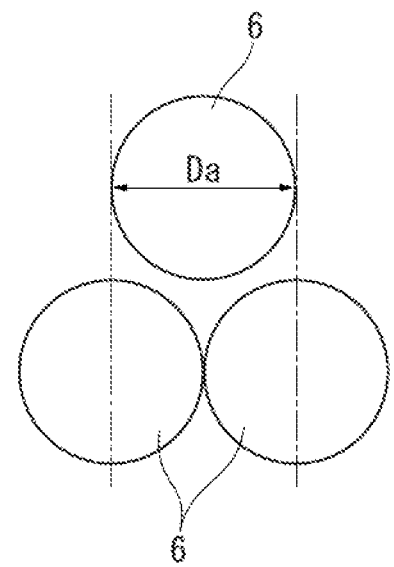
FIG. 5 is a schematic diagram illustrating a relationship between an inclined surface and the number of balls.

When the movable member 3 inclines, the crowning 12 receives load. Lengths $L_1$, $L_2$, and $L_3$ of the first inclined surface 21, the second inclined surface 22, and the third inclined surface 23 of the crowning 12 are set as follows:

The first inclined surface 21 is a region that is subjected to the heaviest load when the movable member 3 inclines. Hence, the length $L_1$ of the first inclined surface 21 is set to equal to or greater than 1 Da, preferably equal to or greater than 2 Da. As illustrated in FIG. 5, given that the length is 1 Da, when one ball 6 goes out, a new ball 6 goes in at the same time. Consequently, a maximum of two balls 6 go in.

As illustrated in FIG. 4, the second inclined surface 22 is a region that receives load similarly to the first inclined surface 21 although the load is not as heavy as that of the first inclined surface 21. The length $L_2$ of the second inclined surface 22 is set to equal to or greater than 1 Da to distribute the load. However, if $L_2$ is too long, the load capacity of the entire motion guide apparatus 1 is reduced. Accordingly, $L_1 > L_2$ is set. In the embodiment, $L_2$ is set to 1 to 1.5 Da.

The third inclined surface 23 is a region that, when the movable member 3 inclines, inclines at an angle similar to a known crowning and starts receiving load. As described above, the third inclined surface 23 is inclined more than the second inclined surface 22. When two balls 6 go in the third inclined surface 23, the ball 6 closer to the second inclined surface 22 receives most of the load. Accordingly, the length $L_3$ of the third inclined surface 23 is set to equal to or less than 1 Da. In the embodiment, $L_3 < L_2$.

The purpose of the chamfer 13 is to avoid a collision of the ball 6 with an end of the movable member 3. As the length of the chamfer 13 is increased, the number of effective balls that can receive load is reduced. Accordingly, the length La of the chamfer 13 is set to equal to or less than 1 Da. In the embodiment, La<$L_3$.

It is desirable to provide the crowning 12 with three or more steps, the inclined surfaces 21, 22, and 23. However, it is also possible to provide the crowning 12 with two steps, the inclined surfaces 21 and 22, or two steps, the inclined surfaces 21 and 23, considering workability and machining precision.

Figure 6A:
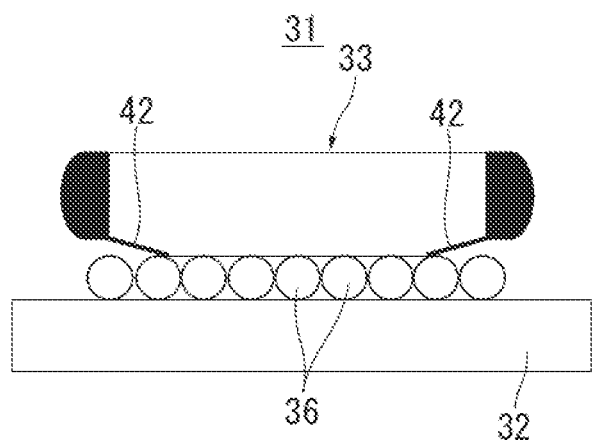
FIGS. 6A to 6C are schematic diagrams where a known motion guide apparatus and the motion guide apparatus according to the embodiment are compared in terms of states where movable members are inclined (FIGS. 6A and 6B illustrate the known motion guide apparatus, and FIG. 6C illustrates the motion guide apparatus according to the embodiment).
Figure 6B:
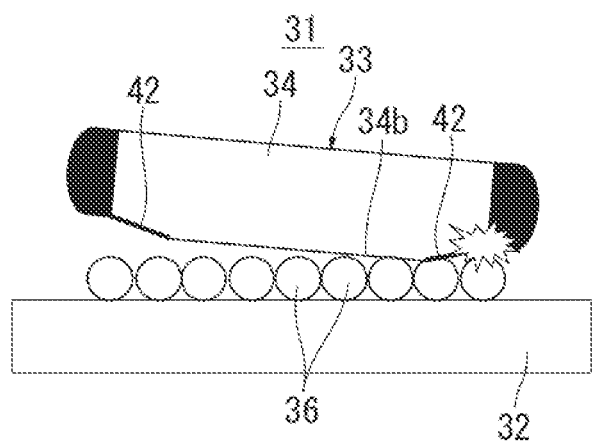
Figure 6C:
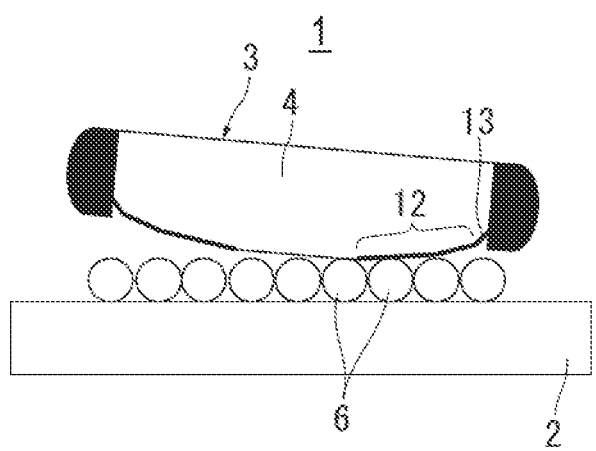

FIGS. 6A to 6C are schematic diagrams where a known motion guide apparatus 31 and the motion guide apparatus 1 according to the embodiment are compared in terms of states where the movable member 3 and a movable member 33 are inclined. FIGS. 6A and 6B illustrate the known motion guide apparatus 31. FIG. 6C illustrates the motion guide apparatus 1 according to the embodiment.

As illustrated in FIG. 6A, in the known motion guide apparatus 31, a crowning 42 is designed to substantially evenly apply load to balls 36 inside the movable member 33, and to prevent load from being applied to the balls 36 at ends of the movable member 33.

If the known motion guide apparatus 31 is used in a state where an excessive pitching moment works thereon, however, the movable member 33 inclines about an axis running from left to right as illustrated in FIG. 6B. When the movable member 33 inclines, a gap between the end of the movable member 33 and a rail 32 is reduced as compared to the diameter of the ball 36, the circulating ball 36 collides with an end of the movable member body 34, and the end of the movable member body 34 malfunctions at an early stage. If the movable member 33 is forced to be driven, the load on the ball 36 increases at a boundary between a loaded ball rolling surface 34b and the crowning 42 where the gap is further reduced, and the boundary also malfunctions at an early stage.

On the other hand, as illustrated in FIG. 6C, in the embodiment, the crowning 12 is designed to be long, and the chamfer 13 for preventing a collision of the ball 6 is formed at the end of the crowning 12. The formation of the chamfer 13 at the end of the crowning 12 allows preventing the ball 6 that enters the loaded path 10 from colliding with the end of the movable member body 4 even when the movable member 3 inclines. Moreover, the total length L of the crowning 12 and the chamfer 13 is long; accordingly, even when the movable member 3 inclines, it is possible to increase the number of the balls 6 that receive load and to prevent the application of excessive load to each ball 6.

Figure 7A:
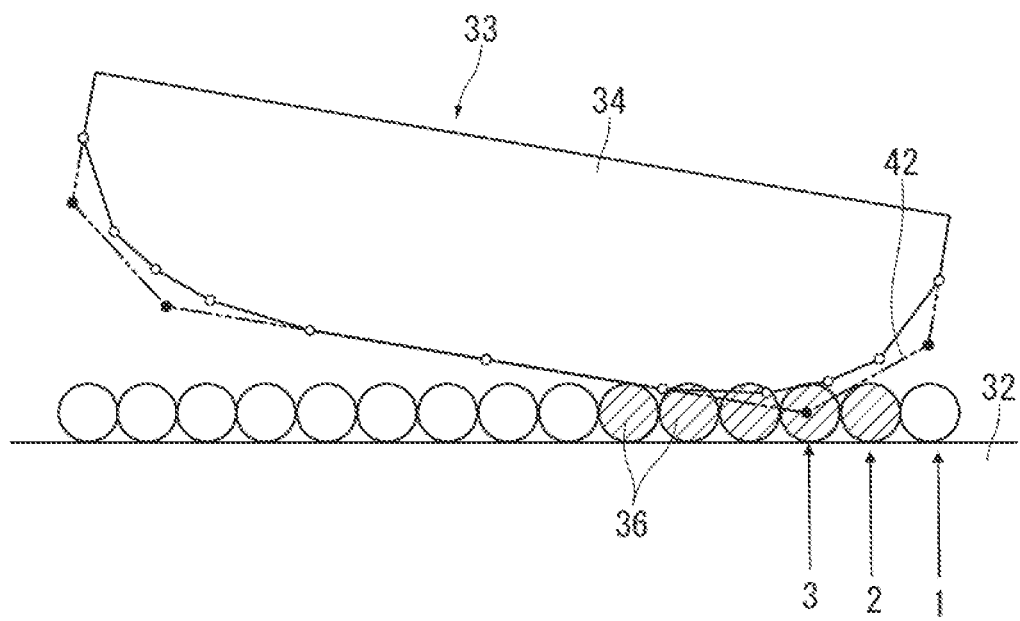
FIGS. 7A and 7B are schematic diagrams explaining how the numbers of balls under load change due to the influence of the inclination of the movable members (FIG. 7A illustrates the known motion guide apparatus, and FIG. 7B illustrates the motion guide apparatus according to the embodiment).
Figure 7B:
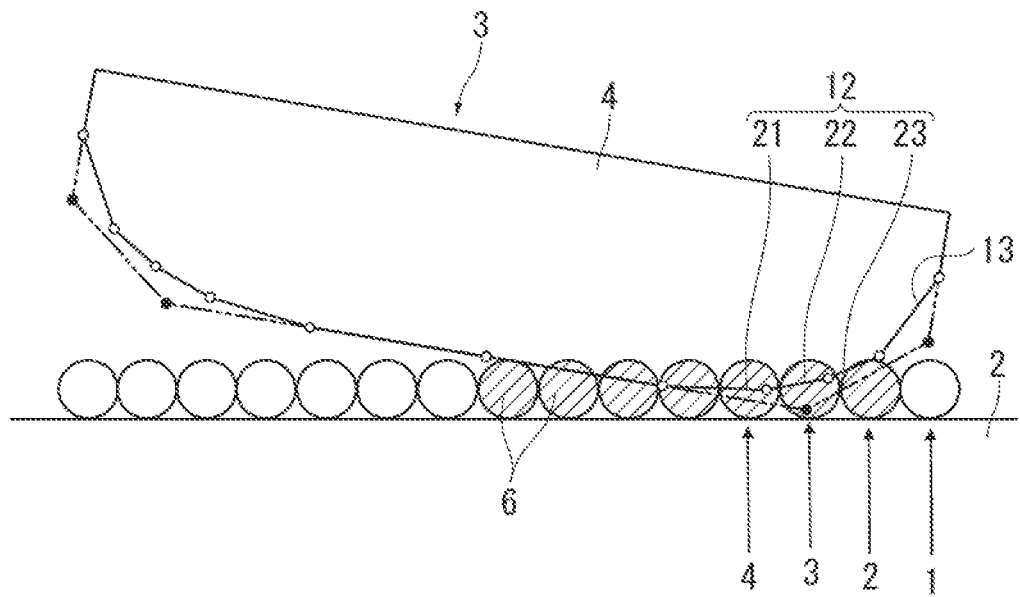

FIGS. 7A and 7B are schematic diagrams explaining how the numbers of the balls 6 and 36 under load change due to the influence of the inclination of the movable members 3 and 33. In FIGS. 7A and 7B, chain double-dashed lines indicate the known crowning shape (the crowning 42), and solid lines indicate the crowning shape (the crowning 12 and the chamfer 13) according to the embodiment. The reference signs 2 and 32 denote the rail, the reference signs 3 and 33 denote the movable member, and the reference signs 6 and 36 denote the ball.

FIG. 7A illustrates in a deformed manner a state of the ball 36 deforming elastically due to an excessive pitching moment by placing the chain double-dashed line crowning shape around the center of the ball 36. In a case of the known crowning shape, the third ball 36 from the end is subjected to the largest elastic deformation. The balls 36 under load are the balls 36 crossing the chain double-dashed line. The five hatched balls 36 are under load.

FIG. 7B illustrates a state of the crowning shape according to the embodiment to which an excessive pitching moment is applied, as in FIG. 7A. The ball 6 subjected to the largest elastic deformation is the fourth ball 6. The balls 6 under load are the balls 6 crossing the solid line. The seven hatched balls 6 are under load. It can be seen that the number of balls under load is increased as compared to the case of FIG. 7A.

Figure 8:
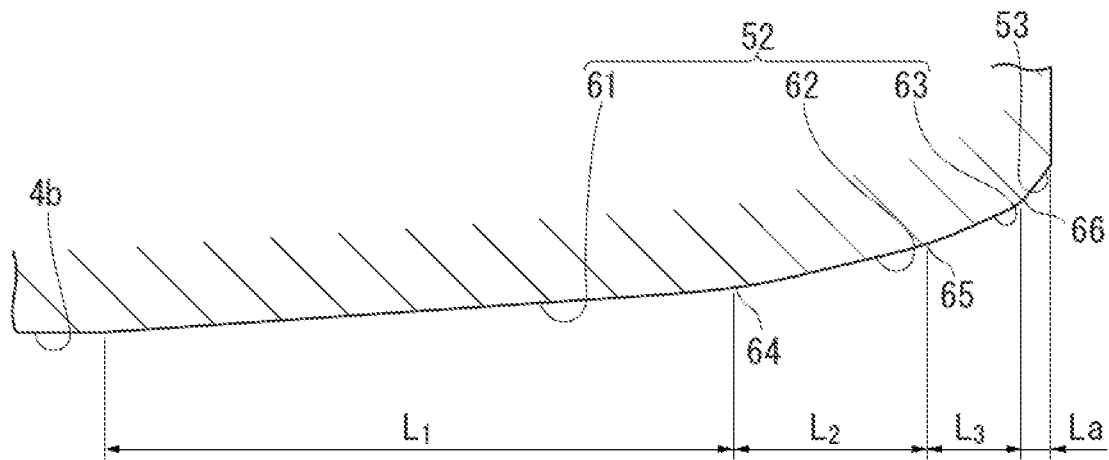
FIG. 8 is a diagram illustrating another example of the crowning and the chamfer as viewed in cross section in the contact angle direction.

FIG. 8 illustrates another example of a crowning 52 and a chamfer 53 as viewed in cross section in the contact angle direction. In this example, an arc-shaped R portion 64 is formed between a first inclined surface 61 and a second inclined surface 62. An arc-shaped R portion 65 is formed between the second inclined surface 62 and a third inclined surface 63. An arc-shaped R portion 66 is formed between the third inclined surface 63 and the chamfer 53. The formation of the R portions 64, 65, and 66 allows smoother movement of the balls 6 across boundaries thereof.

Up to this point, the configuration of the motion guide apparatus 1 according to the embodiment has been described. The motion guide apparatus 1 according to the embodiment has the following effects:

The chamfer 13 is formed at the end of the crowning 12; accordingly, it is possible to prevent the ball 6 that enters the loaded path 10 from colliding with the end of the movable member 3 even when the movable member 3 inclines relative to the rail 2. Moreover, the total length L of the crowning 12 and the chamfer 13 is increased to L/Da>4. Accordingly, it is possible to increase the number of the balls 6 that can receive load and prevent the application of excessive load to each ball 6 when the movable member 3 inclines relative to the rail 2.

The maximum depth D of the chamfer 13 is set to equal to or greater than the elastic deformation amount of the ball rolling surface 2a, the loaded ball rolling surface 4b, and the ball 6 under a radial load equal to or greater than 60% of the basic dynamic load rating (C); accordingly, it is possible to ensure the prevention of a collision of the ball 6 with the end of the movable member body 4.

The length La of the chamfer 13 is set to equal to or less than 1 Da; accordingly, it is possible to prevent a reduction in the number of effective balls that can receive load.

The length $L_1$ of the first inclined surface 21 is set to equal to or greater than 1 Da, the length $L_2$ of the second inclined surface 22 is set to equal to or greater than 1 Da, and $L_1 > L_2$ is set; accordingly, it is possible to increase the number of the balls 6 that receive load at the crowning 12 when the movable member 3 inclines. Moreover, the balls 6 move smoothly at the crowning 12.

The crowning 12 is provided with the third inclined surface 23; accordingly, the balls 6 can smoothly go in and out of the crowning 12. Moreover, the length $L_3$ of the third inclined surface 23 is set to equal to or less than 1 Da;

accordingly, it is possible to prevent two balls 6 from entering the third inclined surface 23 with a large inclination and prevent the ball 6 closer to the second inclined surface 22 from receiving most of the load.

The rolling element is not limited to the ball 6 and may be a roller. However, if a roller is used as the rolling element, skewing being a phenomenon where the roller inclines when an excessive pitching moment is applied thereto may occur. This can be prevented by the use of the ball 6 as the rolling element.

The present invention is not limited to the realization of the above embodiment, and can be modified to other embodiments within the scope where the gist of the present invention is not changed.

The movement of the movable member is relative to the track member. The movable member may move, or the track member may move.

It is also possible to form the first inclined surface, the second inclined surface, the third inclined surface and the chamfer into a curve as viewed in cross section in the contact angle direction.

Example 1

Given that the radial load is 90% of the basic dynamic load rating (0.9 C), an FEM analysis was performed on the motion guide apparatus 1 and the mounted members 8 and 9 to calculate load on the ball 6 inside the movable member 3.

Figure 9A:
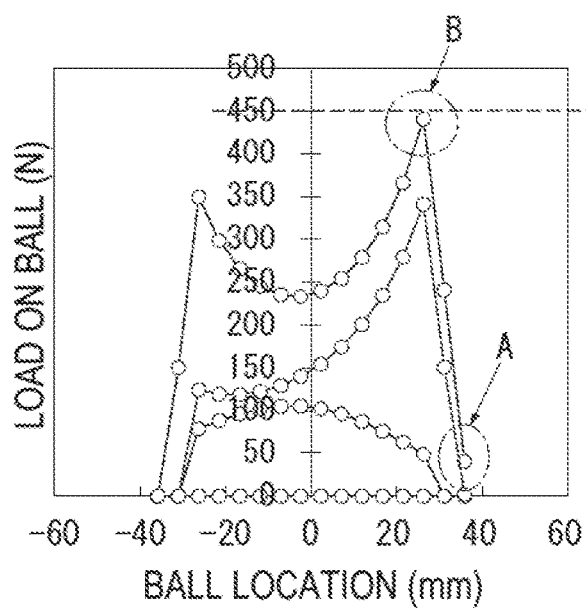
FIG. 9A is a graph illustrating load on the ball of the known motion guide apparatus crowned in a standard manner.
Figure 9B:
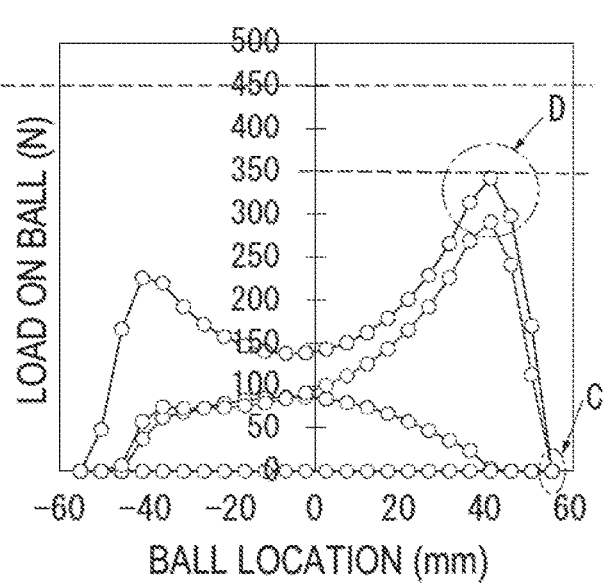
FIG. 9B is a graph illustrating load on the ball of the motion guide apparatus according to the embodiment.

FIG. 9A illustrates load on the ball 36 of the known motion guide apparatus 31 crowned in a standard manner. FIG. 9B illustrates load on the ball 6 of the motion guide apparatus 1 according to the embodiment. There were four ball rows; accordingly, FIGS. 9A and 9B illustrate load on each of the four ball rows.

As illustrated in FIG. 9A, the result of the analysis shows that, in the known motion guide apparatus 31, the ball 36 (indicated by A in the figure) at the end of the movable member 33 was under load and the ball 36 (indicated by B in the figure) at the boundary between the loaded ball rolling surface 34b and the crowning 42 was under the heaviest load. The result of the analysis agreed with an actual situation in a state where an excessive moment worked.

On the other hand, as illustrated in FIG. 9B, in the motion guide apparatus 1 according to the embodiment, the load on the ball 6 (indicated by C in the figure) at the end of the movable member 3 became zero, and the maximum load on the ball 6 (indicated by D in the figure) at the crowning 12 could be reduced to approximately 80% as compared to FIG. 9A. Hence, it was found that the calculated running life is increased to double or more.

Second Embodiment

Figure 10:
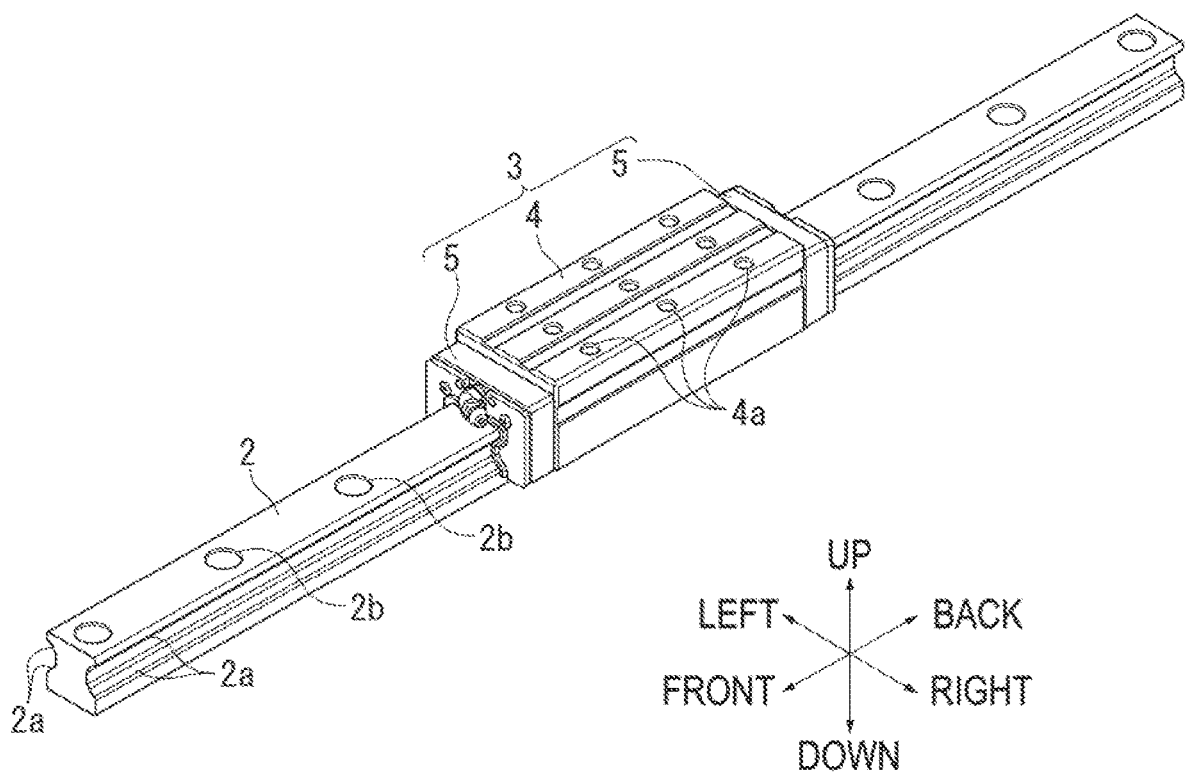
FIG. 10 is a perspective view of a motion guide apparatus according to a second embodiment of the present invention.

FIG. 10 illustrates a perspective view of a motion guide apparatus according to a second embodiment of the present invention. For the sake of explanation, assuming that the motion guide apparatus is placed on a horizontal plane, the configuration of the motion guide apparatus is described below on the basis of directions as viewed in a length direction of a rail, that is, a front-and-back direction, an up-and-down direction, and a left-and-right direction in FIG. 10. Naturally, the placement of the motion guide apparatus is not limited to the above.

A motion guide apparatus 1 includes a rail 2 as a track member, and a movable member 3 that is assembled to the rail 2 via a plurality of balls 6 (refer to FIG. 11) as rolling elements in such a manner as to be movable relative to the rail 2 in a length direction thereof. A plurality of ball rolling surfaces 2a as rolling element rolling surfaces is formed along a longitudinal direction on side surfaces of the rail 2. The ball rolling surface 2a is shaped into a groove. A plurality of bolt holes 2b for mounting the rail 2 on a mounted member 8 (refer to FIG. 12) is formed with a constant pitch in an upper surface of the rail 2.

The movable member 3 includes a movable member body 4, and a lid member 5 provided at each of both ends of the movable member body 4. Circulation paths 7 (refer to FIG. 11) for the balls 6 are formed inside the movable member 3. The plurality of balls 6 circulates in the circulation path 7 with the relative movement of the movable member 3. A plurality of screw holes 4a for mounting the movable member 3 on a mounted member 9 (refer to FIG. 12) is formed in an upper surface of the movable member body 4.

Figure 11:
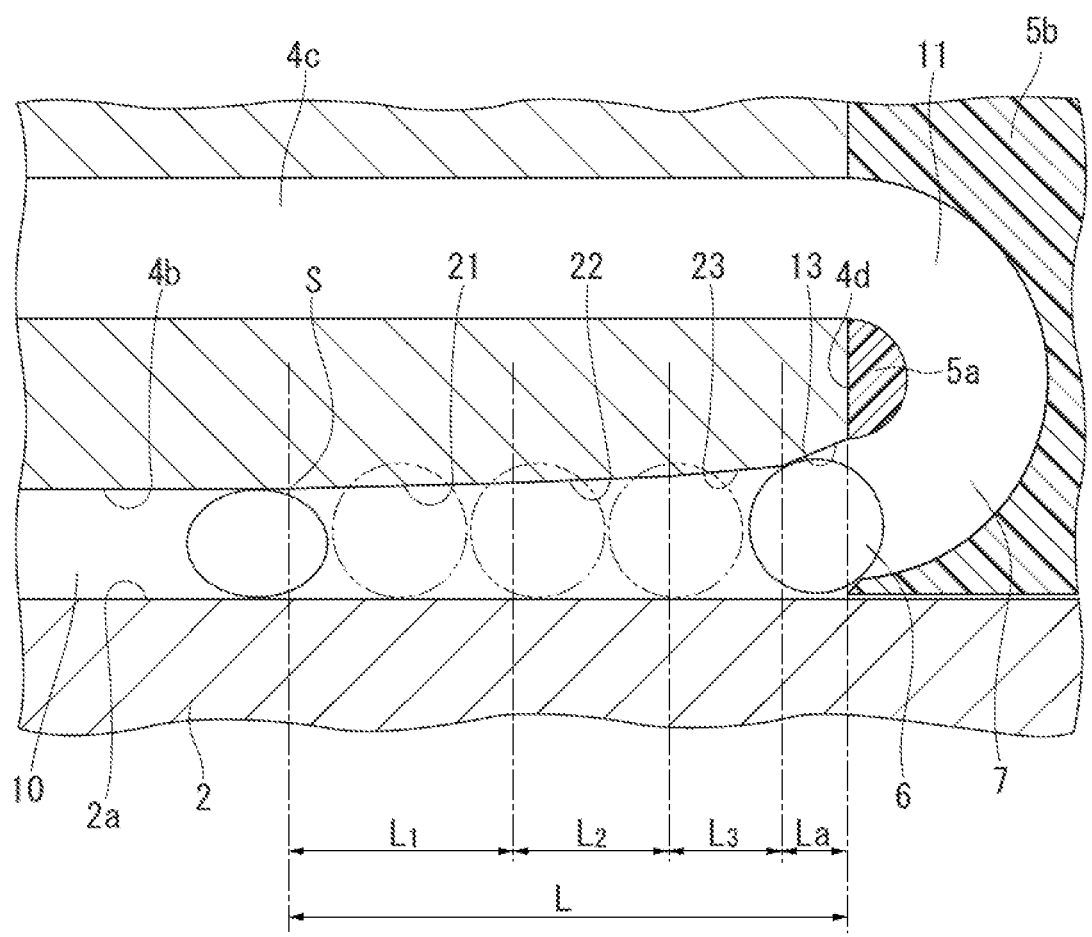
FIG. 11 is a cross-sectional view of a circulation path of the motion guide apparatus according to the embodiment.

FIG. 11 illustrates a cross-sectional view of the circulation path 7 of the motion guide apparatus 1 according to the embodiment. The movable member body 4 includes loaded ball rolling surfaces 4b formed as loaded rolling element rolling surfaces facing the ball rolling surfaces 2a of the rail 2, and also return paths 4c formed substantially parallel to the loaded ball rolling surfaces 4b. The loaded ball rolling surface 4b is shaped into a groove. Turn-around paths 11 each connected to the loaded ball rolling surface 4b and the return path 4c are formed in the lid member 5. The lid member 5 includes inner guides 5a that each form an inner peripheral side of the turn-around path 11, and outer guides 5b that each form an outer peripheral side of the turn-around path 11.

The loaded ball rolling surface 4b of the movable member 3 and the ball rolling surface 2a of the rail 2 configure a loaded path 10. The loaded path 10, the return path 4c, and the turn-around paths 11 configure the circulation path 7 for the balls 6. The ball 6 enters the loaded path 10 from the turn-around path 11, and leaves the loaded path 10 to the turn-around path 11. A spacer may or may not be disposed between the balls 6.

The motion guide apparatus 1 according to the embodiment is used in an environment where an excessive moment, particularly a pitching moment, works thereon. In this case, as illustrated in FIG. 10, the movable member 3 inclines relative to the rail 2 about an axis running from left to right.

Figure 12:
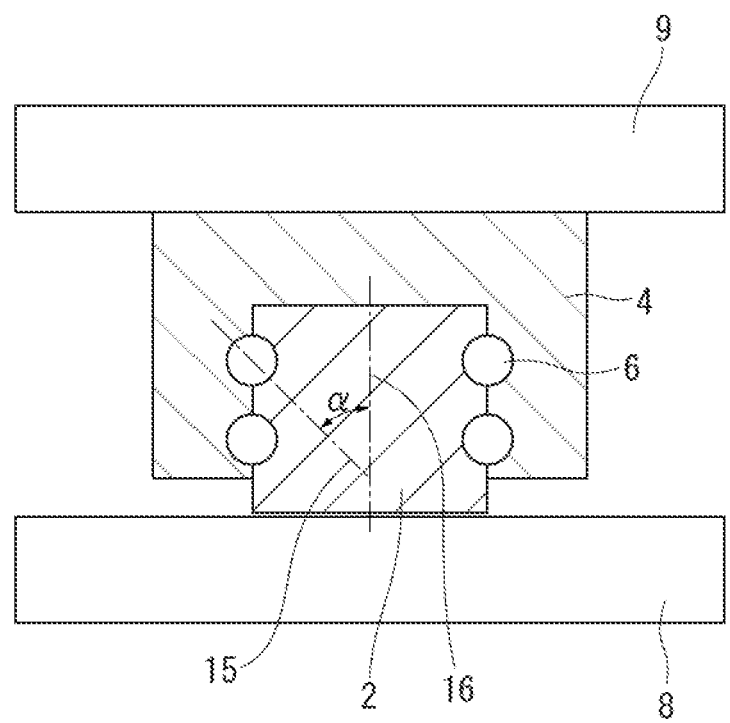
FIG. 12 is a cross-sectional view (a cross-sectional view orthogonal to a moving direction) of the motion guide apparatus according to the embodiment.
Figure 13:
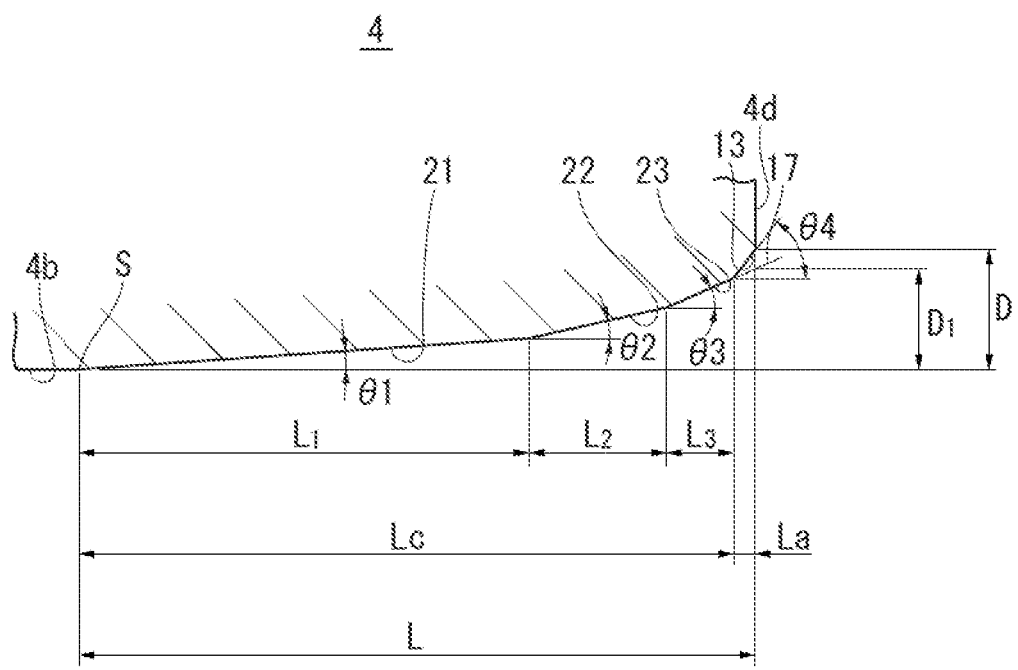
FIG. 13 illustrates the shape of a rolling surface as viewed in cross section in a contact angle direction.

FIG. 12 illustrates a cross-sectional view of the motion guide apparatus 1. The reference sign 2 denotes the rail, the reference sign 4 denotes the movable member body, the reference signs 8 and 9 denote the mounted members, and the reference sign 6 denotes the ball. In FIG. 12, the return paths 4c in the movable member body 4 are omitted. FIG. 13 illustrates the shape of the rolling surface as viewed in cross section in a contact angle direction.

A typical example of the mounted members 8 and 9 is a base of a machine tool, and is a rigid body. However, if the mounted member 8 is, for example, a hollow member with low stiffness, the stiffness of the mounted member 8 is insufficient, the rail 2 deforms, and the rail 2 inclines relative to the movable member 3. The same applies if the mounting precision of the motion guide apparatus 1 is insufficient. In other words, the motion guide apparatus 1 according to the embodiment can be used not only when an excessive pitching moment works thereon but also when the stiffness of the mounted members 8 and 9 is insufficient, or when the mounting precision of the motion guide apparatus 1 is insufficient.

As illustrated in FIG. 11, a first inclined surface 21, a second inclined surface 22, a third inclined surface 23, and a chamfer 13 are formed at each of both ends of the loaded ball rolling surface 4b of the movable member 3. FIG. 11 illustrates the first inclined surface 21, the second inclined surface 22, the third inclined surface 23, and the chamfer 13 at one end of the loaded ball rolling surface 4b. However, the first inclined surface 21, the second inclined surface 22, the third inclined surface 23, and the chamfer 13 are formed at each of both ends of the loaded ball rolling surface 4b.

The first inclined surface 21 is formed next to the loaded ball rolling surface 4b, and inclined relative to the loaded ball rolling surface 4b. The second inclined surface 22 is formed next to the first inclined surface 21, and inclined more than the first inclined surface 21. The third inclined surface 23 is formed next to the second inclined surface 22, and inclined more than the second inclined surface 22. The chamfer 13 is formed next to the third inclined surface 23, and inclined more than the third inclined surface 23. Let the angle formed between the loaded ball rolling surface 4b and the first inclined surface 21 be $\theta_1$, let the angle formed between the loaded ball rolling surface 4b and the second inclined surface 22 be $\theta_2$, let the angle formed between the loaded ball rolling surface 4b and the third inclined surface 23 be $\theta_3$, and let the angle formed between the loaded ball rolling surface 4b and the chamfer 13 be $\theta_4$. $\theta_1 < \theta_2 < \theta_3 < \theta_4$ is set.

FIG. 13 illustrates the first inclined surface 21, the second inclined surface 22, the third inclined surface 23, and the chamfer 13 as viewed in cross section in the contact angle direction. As illustrated in FIG. 12, a contact angle $\alpha$ is the angle formed between a line 15 linking a ball contact point on the rail 2 side and a ball contact point on the movable member 3 side and a radial load working direction 16. For example, if the contact angle $\alpha$ is 45°, it indicates that the ball rolling surface 2a and the loaded ball rolling surface 4b, and the ball 6 are in contact with each other with an inclination of 45° relative to the radial load working direction 16.

Figure 14:
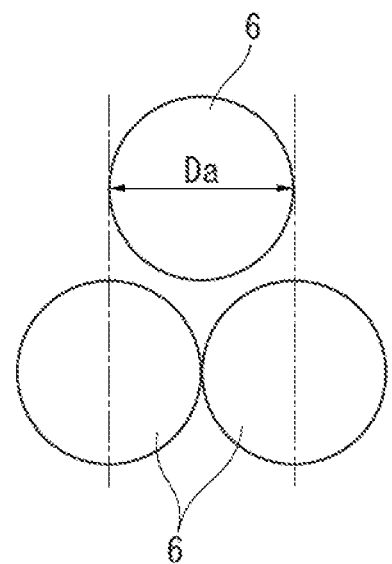
FIG. 14 is a schematic diagram illustrating a relationship between the length of the rolling surface and the number of balls.

When the movable member 3 inclines, the first inclined surface 21, the second inclined surface 22, and the third inclined surface 23 receive load. Lengths $L_1$, $L_2$, and $L_3$ of the first inclined surface 21, the second inclined surface 22, and the third inclined surface 23 are set as follows:

The first inclined surface 21 is a region that is subjected to the heaviest load when the movable member 3 inclines. Hence, the length $L_1$ of the first inclined surface 21 is set to equal to or greater than 1 Da where Da is the diameter of the ball 6, preferably equal to or greater than 2 Da. As illustrated in FIG. 14, given that the length is 1 Da, when one ball 6 goes out, a new ball 6 goes in at the same time. Consequently, a maximum of two balls 6 go in.

As illustrated in FIG. 13, the second inclined surface 22 is a region that receives load similarly to the first inclined surface 21 although the load is not as heavy as that of the first inclined surface 21. The length $L_2$ of the second inclined surface 22 is set to equal to or greater than 1 Da to distribute the load. However, if $L_2$ is too long, the load capacity of the entire motion guide apparatus 1 is reduced. Accordingly, $L_1 > L_2$ is set. In the embodiment, $L_2$ is set to 1 to 1.5 Da.

The third inclined surface 23 is a region that, when the movable member 3 inclines, inclines at an angle similar to a known crowning and starts receiving load. As described above, the inclination of the third inclined surface 23 is large. When two balls 6 go in the third inclined surface 23, the ball 6 closer to the second inclined surface 22 receives most of the load. Accordingly, the length $L_3$ of the third inclined surface 23 is set to equal to or less than 1 Da. In the embodiment, $L_2 > L_3$ is set.

The purpose of the chamfer 13 is to avoid a collision of the ball 6 with an end of the movable member 3. As the length of the chamfer 13 is increased, the number of effective balls that can receive load is reduced. Accordingly, a length La of the chamfer 13 is set to equal to or less than 1 Da. In the embodiment, $L_3 > La$ is set.

As illustrated in FIG. 13, a length L from a starting point S where the first inclined surface 21 starts forming on the loaded ball rolling surface 4b to an end surface 4d of the movable member body 4 is set to L/Da>4, preferably L/Da 5. The combined length of the lengths L at both ends (that is, 2 L) is set to, for example, 10 to 50% of the total length of the movable member body 4 in the relative movement direction.

A maximum depth D of the chamfer 13 illustrated in FIG. 13 (the depth from the loaded ball rolling surface 4b to an end of the chamfer 13) is set to equal to or greater than the elastic deformation amount of the ball rolling surface 2a and the loaded ball rolling surface 4b, and the ball 6 under a radial load equal to or greater than 60% (for example, 60%, 70%, 80%, 90%, or 100%) of the basic dynamic load rating (C). Moreover, a depth $D_1$ from the loaded ball rolling surface 4b to a point of intersection of an extended line 17 of the third inclined surface 23 and the end surface 4d of the movable member body 4 is also set to equal to or greater than the elastic deformation amount under a radial load equal to or greater than 60% of the basic dynamic load rating (C). The basis dynamic load rating (C) is determined depending on the structure of the motion guide apparatus 1.

It is desirable to provide the first inclined surface 21, the second inclined surface 22, and the third inclined surface 23. However, it is also possible to omit the third inclined surface 23, considering workability and machining precision.

Figure 15A:
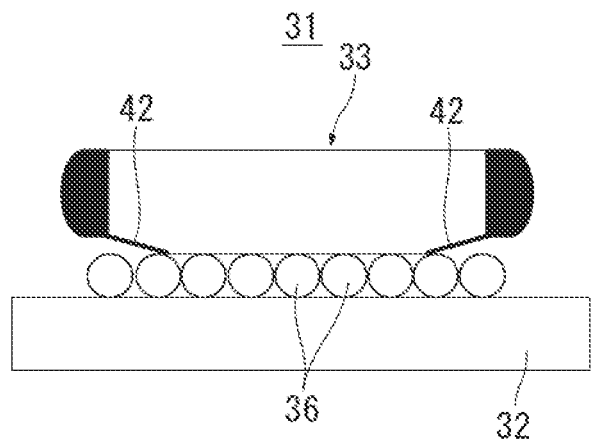
FIGS. 15A to 15C are diagrams where a known motion guide apparatus and the motion guide apparatus according to the embodiment are compared in terms of states where movable members are inclined (FIGS. 15A and 15B illustrate the known motion guide apparatus, and FIG. 15C illustrates the motion guide apparatus according to the embodiment).
Figure 15B:
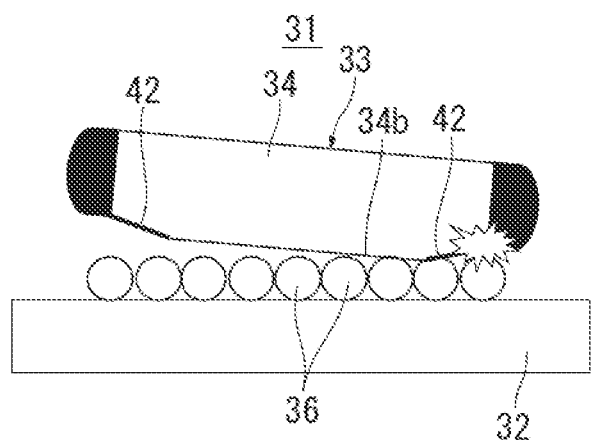
Figure 15C:
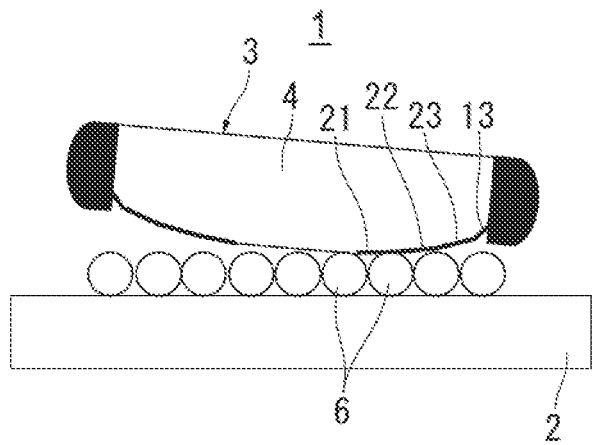

FIGS. 15A to 15C are schematic diagrams where a known motion guide apparatus 31 and the motion guide apparatus 1 according to the embodiment are compared in terms of states where the movable member 3 and a movable member 33 are inclined. FIGS. 15A and 15B illustrate the known motion guide apparatus 31. FIG. 15C illustrates the motion guide apparatus 1 according to the embodiment.

As illustrated in FIG. 15A, in the known motion guide apparatus 31, a crowning 42 is designed to substantially evenly apply load to balls 36 inside the movable member 33, and to prevent load from being applied to the balls 36 at ends of the movable member 33.

If the known motion guide apparatus 31 is used in a state where an excessive pitching moment works thereon, however, the movable member 33 inclines about an axis running from left to right as illustrated in FIG. 15B. When the movable member 33 inclines, a gap between the end of the movable member 33 and a rail 32 is reduced as compared to the diameter of the ball 36, the circulating ball 36 collides with an end of the movable member body 34, and the end of the movable member body 34 malfunctions at an early stage. If the movable member 33 is forced to be driven, the load on the ball 36 increases at a boundary between a loaded ball rolling surface 34b and the crowning 42 where the gap is further reduced, and the boundary also malfunctions at an early stage.

On the other hand, in the embodiment, the first inclined surfaces 21, the second inclined surfaces 22, and the third inclined surfaces 23 are formed at the ends of the loaded ball rolling surface 4b as illustrated in FIG. 15C. Hence, when the movable member 3 inclines relative to the rail 2, a plurality of the balls 6 in the first inclined surface 21, the second inclined surface 22, and the third inclined surface 23 can receive load, and it is possible to prevent the application of excessive load to each ball 6. Moreover, the chamfers 13 for preventing a collision are formed at the ends of the movable member body 4; accordingly, it is possible to prevent the ball 6 that enters the loaded path 10 from colliding with the end of the movable member body 4 even when the movable member 3 inclines.

Figure 16A:
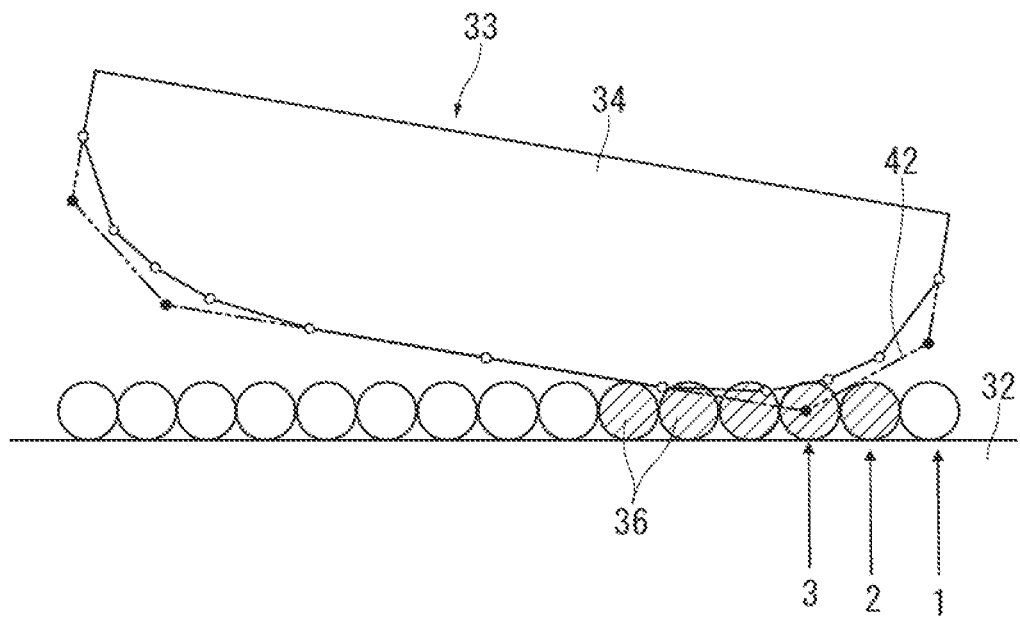
FIGS. 16A and 16B are schematic diagrams explaining how the numbers of balls under load change due to the influence of the inclination of the movable members (FIG. 16A illustrates the known motion guide apparatus, and FIG. 16B illustrates the motion guide apparatus according to the embodiment).
Figure 16B:
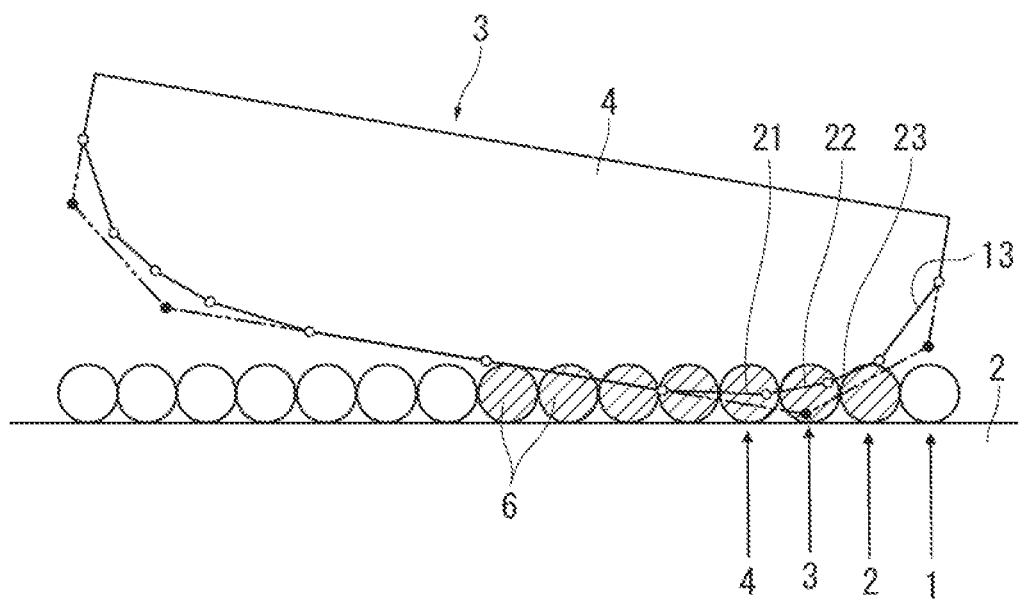

FIGS. 16A and 16B are schematic diagrams explaining how the numbers of the balls 6 and 36 under load change due to the influence of the inclination of the movable members 3 and 33. In FIGS. 16A and 16B, chain double-dashed lines indicate the known rolling surface shape (the crowning 42), and solid lines indicate the rolling surface shape (the first inclined surface 21, the second inclined surface 22, the third inclined surface 23, and the chamfer 13) according to the embodiment. The reference signs 2 and 32 denote the rail, the reference signs 3 and 33 denote the movable member, and the reference signs 6 and 36 denote the ball.

FIG. 16A illustrates in a deformed manner a state of the ball 36 deforming elastically due to an excessive pitching moment by placing the chain double-dashed line crowning 42 around the center of the ball 36. In a case of the known rolling surface shape, the third ball 36 from the end is subjected to the largest elastic deformation. The balls 36 under load are the balls 36 crossing the chain double-dashed line. The five hatched balls 36 are under load.

FIG. 16B illustrates a state of the rolling surface shape according to the embodiment to which an excessive pitching moment is applied, as in FIG. 16A. The ball 6 subjected to the largest elastic deformation is the fourth ball 6. The balls 6 under load are the balls 6 crossing the solid line. The seven hatched balls 6 are under load. It can be seen that the number of balls under load is increased as compared to the case of FIG. 16A.

Figure 17:
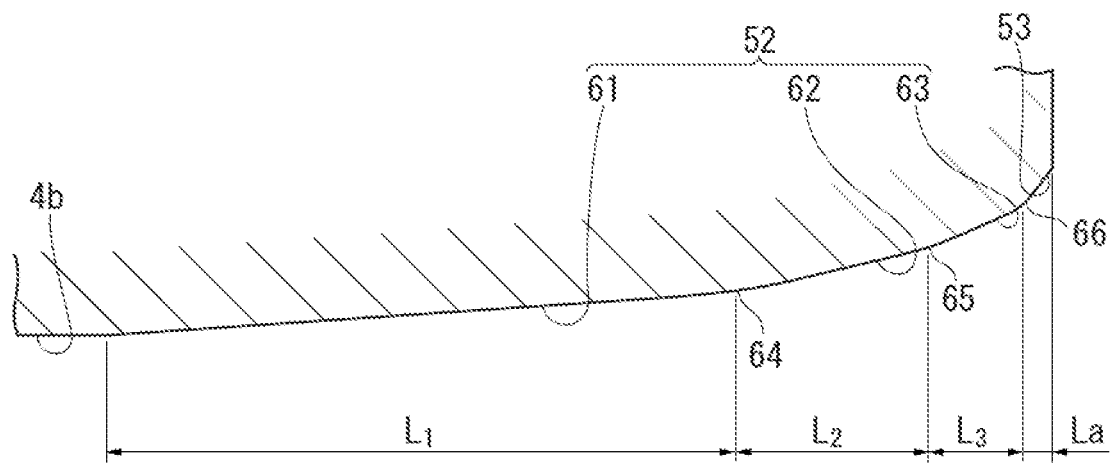
FIG. 17 is a diagram illustrating another example of the shape of the rolling surface as viewed in cross section in the contact angle direction.

FIG. 17 illustrates another example of the rolling surface shape as viewed in cross section in the contact angle direction. In this example, an arc-shaped R portion 64 is formed between a first inclined surface 61 and a second inclined surface 62. An arc-shaped R portion 65 is formed between the second inclined surface 62 and a third inclined surface 63. An arc-shaped R portion 66 is formed between the third inclined surface 63 and a chamfer 53. The formation of the R portions 64, 65, and 66 allows smoother movement of the balls 6 across boundaries thereof.

Up to this point, the configuration of the motion guide apparatus 1 according to the embodiment has been described. The motion guide apparatus 1 according to the embodiment has the following effects:

The first inclined surfaces 21 and the second inclined surfaces 22 are provided at the ends of the ball rolling groove 4b of the movable member body 4. $L_1 \geq 1$ Da and $L_2 \geq 1$ Da are set. Accordingly, when the movable member 3 inclines relative to the rail 2, a plurality of the balls 6 in the first inclined surface 21 and the second inclined surface 22 can receive load, and it is possible to prevent the application of excessive load to each ball 6. Moreover, $L_1 > L_2$ is set. Accordingly, it is possible to further increase the load capacity of the motion guide apparatus 1.

The third inclined surface 23 inclined more than the second inclined surface 22 is formed at the end of the second inclined surface 22; accordingly, the ball 6 can go in and out of the third inclined surface 23 smoothly as in the known crowning. Moreover, the length $L_3$ of the third inclined surface 23 is set to equal to or less than 1 Da; accordingly, it is possible to prevent two balls 6 from entering the third inclined surface 23 with a large inclination and to prevent the ball 6 closer to the second inclined surface 22 from receiving most of the load.

The chamfers 13 inclined more than the third inclined surfaces 23 are formed at the ends of the movable member body 4; accordingly, it is possible to prevent the ball 6 entering the loaded path 10 from colliding with the end of the movable member body 4 when the movable member 3 inclines relative to the rail 2. Moreover, the length La of the chamfer 13 is set to equal to or less than 1 Da; accordingly, it is possible to prevent a reduction in the number of effective balls that can receive load.

Let the length from the starting point S where the first inclined surface 21 starts forming on the loaded ball rolling surface 4b of the movable member body 4 to the end surface 4d of the movable member body 4 be L. L/Da>4 is set; accordingly, it is possible to, when the movable member 3 inclines relative to the rail 2, increase the number of the balls 6 that can receive load and prevent the application of excessive load to each ball 6.

The present invention is not limited to the realization of the above embodiment, and can be modified to other embodiments within the scope where the gist of the present invention is not changed.

The rolling element is not limited to the ball and may be a roller. However, if a roller is used as the rolling element, skewing being a phenomenon where the roller inclines when an excessive pitching moment is applied thereto may occur. This can be prevented by the use of the ball as the rolling element.

The movement of the movable member is relative to the track member. The movable member may move, or the track member may move.

It is also possible to form the first inclined surface, the second inclined surface, the third inclined surface and the chamfer into a curve as viewed in cross section in the contact angle direction.

Example 2

Given that the radial load is 90% of the basic dynamic load rating (0.9 C), an FEM analysis was performed on the motion guide apparatus 1 and the mounted members 8 and 9 to calculate load on the ball 6 inside the movable member 3.

FIG. 18A illustrates load on the ball 36 of the known motion guide apparatus 31 crowned in a standard manner. FIG. 18B illustrates load on the ball 6 of the motion guide apparatus 1 according to the embodiment. There were four ball rows; accordingly, FIGS. 18A and 18B illustrate load on each of the four ball rows.

As illustrated in FIG. 18A, the result of the analysis shows that, in the known motion guide apparatus 31, the ball 36 (indicated by A in the figure) at the end of the movable member 33 was under load and the ball 36 (indicated by B in the figure) at the boundary between the loaded ball rolling surface 34b and the crowning 42 was under the heaviest load. The result of the analysis agreed with an actual situation in a state where an excessive moment worked.

On the other hand, as illustrated in FIG. 18B, in the motion guide apparatus 1 according to the embodiment, the load on the ball 6 (indicated by C in the figure) at the end of the movable member body 4 became zero, in other words, the ball 6 did not collide with the end of the movable member body 4, and the maximum load on the ball 6 (indicated by D in the figure) could be reduced to approximately 80% as compared to FIG. 18A. Hence, it was found that the calculated running life is increased to double or more.

The description is based on Japanese Patent Application No. 2018-220828 filed on Nov. 27, 2018 and Japanese Patent Application No. 2018-220829 filed on Nov. 27, 2018, the entire contents of which are incorporated herein.

REFERENCE SIGNS LIST

1 Motion guide apparatus
2 Rail (track member)
2a Ball rolling surface (rolling element rolling surface)
3 Movable member
4 Movable member body
4b Loaded ball rolling surface (loaded rolling element rolling surface)
4c Return path
5 Lid member
6 Ball (rolling element)
11 Turn-around path
12 Crowning
13 Chamfer
21 First inclined surface
22 Second inclined surface
23 Third inclined surface
52 Crowning
53 Chamfer
61 First inclined surface
62 Second inclined surface
63 Third inclined surface
S Starting point of the first inclined surface

The invention claimed is:

1. A motion guide apparatus comprising:
a track member including a rolling element rolling surface; and
a movable member including a loaded rolling element rolling surface facing the rolling element rolling surface of the track member, the movable member being configured to be assembled to the track member via a plurality of balls in such a manner as to be movable relative to the track member, wherein
a crowning is formed at an end of the loaded rolling element rolling surface of the movable member, and a chamfer is formed at an end of the crowning,
L/Da>4 is set, where L is a total length of the crowning and the chamfer in a length direction of the loaded rolling element rolling surface of the movable member, and Da is the diameter of the ball, and
a maximum depth D of the chamfer from the loaded rolling element rolling surface of the movable member is set to equal to or greater than elastic deformation amount of the rolling element rolling surface of the track member, the loaded rolling element rolling surface of the movable member, and the ball under a radial load equal to or greater than 60% of a basic dynamic load rating (C).

2. The motion guide apparatus according to claim 1, wherein a length La of the chamfer in the length direction is set to equal to or less than 1 Da.

3. The motion guide apparatus according to claim 2, wherein
the crowning includes a first inclined surface formed next to the loaded rolling element rolling surface of the movable member, and a second inclined surface that is formed next to the first inclined surface and inclined more than the first inclined surface, and
$L_1 \geq 1$ Da, $L_2 \geq 1$ Da, and $L_1 > L_2$ are set, where $L_1$ is the length of the first inclined surface in the length direction, and $L_2$ is the length of the second inclined surface in the length direction.

4. The motion guide apparatus according to claim 1, wherein
the crowning includes a first inclined surface formed next to the loaded rolling element rolling surface of the movable member, and a second inclined surface that is formed next to the first inclined surface and inclined more than the first inclined surface, and
$L_1 \geq 1$ Da, $L_2 \geq 1$ Da, and $L_1 > L_2$ are set, where $L_1$ is the length of the first inclined surface in the length direction, and $L_2$ is the length of the second inclined surface in the length direction.

5. The motion guide apparatus according to claim 4, wherein
the crowning includes a third inclined surface that is formed next to the second inclined surface and inclined more than the second inclined surface, and
$L_3 \leq 1$ Da is set, where $L_3$ is the length of the third inclined surface in the length direction.

6. A motion guide apparatus comprising:
a track member including a rolling element rolling surface; and
a movable member configured to be assembled to the track member via a plurality of balls in such a manner as to be movable, the movable member including: a movable member body having a loaded rolling element rolling surface facing the rolling element rolling surface of the track member, and a return path substantially parallel to the loaded rolling element rolling surface; and a lid member provided at an end of the movable member body, the lid member having a turn-around path connected to the loaded rolling element rolling surface and the return path of the movable member body, wherein
a first inclined surface inclined relative to the loaded rolling element rolling surface is formed at an end of the loaded rolling element rolling surface of the movable member body,
a second inclined surface inclined more than the first inclined surface is formed at an end of the first inclined surface,
$L_1 \geq 1$ Da, $L_2 \geq 1$ Da, and $L_1 > L_2$ are set, where $L_1$ is the length of the first inclined surface in a length direction of the loaded rolling element rolling surface of the movable member body, $L_2$ is the length of the second inclined surface in the length direction, and Da is the diameter of the ball, and
a maximum depth D of the chamfer from the loaded rolling element rolling surface of the movable member is set to equal to or greater than elastic deformation amount of the rolling element rolling surface of the track member, the loaded rolling element rolling surface of the movable member, and the ball under a radial load equal to or greater than 60% of a basic dynamic load rating (C).

7. The motion guide apparatus according to claim 6, wherein
a third inclined surface inclined more than the second inclined surface is formed at an end of the second inclined surface, and
$L_3 \leq 1$ Da is set, where $L_3$ is the length of the third inclined surface in the length direction.

8. The motion guide apparatus according to claim 7, wherein a chamfer inclined more than the third inclined surface is formed between the third inclined surface and an end surface of the movable member body, and $La \leq 1\, Da$ is set, where La is the length of the chamfer in the length direction.

9. The motion guide apparatus according to claim 8, wherein $L/Da > 4$ is set, where L is the length from a starting point where the first inclined surface starts forming on the loaded rolling element rolling surface of the movable member body to the end surface of the movable member body.

* * * * *